US010528122B2

(12) United States Patent
Nabwani et al.

(10) Patent No.: US 10,528,122 B2
(45) Date of Patent: Jan. 7, 2020

(54) GESTURE EXPERIENCES IN MULTI-USER ENVIRONMENTS

(71) Applicant: Intel Corporation, Santa Clara, CA (US)

(72) Inventors: Ayoob Nabwani, Julis (IL); Tomer Rider, Naahryia (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/282,710

(22) Filed: Sep. 30, 2016

(65) Prior Publication Data

US 2018/0095525 A1 Apr. 5, 2018

(51) Int. Cl.
*G06F 3/01* (2006.01)
*G06K 9/00* (2006.01)

(52) U.S. Cl.
CPC .............. *G06F 3/011* (2013.01); *G06F 3/017* (2013.01); *G06K 9/00375* (2013.01); *G06K 2009/00395* (2013.01)

(58) Field of Classification Search
CPC ........ G06F 3/017; G06F 3/011; G06F 3/0304; G06F 3/04883; G06F 3/0425; G06F 3/0325; G06F 3/0346; G06F 3/04815; G06F 3/012; G06F 3/0426; G06K 9/00335; G06K 9/00355; G06K 9/00375; G06K 9/00369; G06K 9/00362; G06K 9/00664; G06K 9/00832; G06K 9/32; G06K 9/6232; G06K 9/469; G06K 9/00201; G06K 9/00342; G06K 9/6201; G06K 9/00718; G06K 9/6202; G06K 9/6857; G06K 9/00389; G06K 9/00281; G06K 9/4652; G06K 9/6218; A63F 2300/1093; A63F 2300/8047; A63F 2300/6045; A63F 2300/69; A63F 2300/8088; A63F 2300/1087; A63F 2300/636; A63F 2300/308; A63F 13/814; A63F 13/10; A63F 13/213; A63F 13/428;
(Continued)

(56) References Cited

U.S. PATENT DOCUMENTS 7,308,112 B2 * 12/2007 Fujimura ........... G06K 9/00355
382/103
8,659,658 B2 * 2/2014 Vassigh ................... G06F 3/011
348/143
(Continued)

OTHER PUBLICATIONS

CES, "CES 2014 Opening Keynote—3D Scanning and 3D Printing with Intel RealSense Technology", YouTube.com, Jan. 30, 2014, 2 pages.
(Continued)

*Primary Examiner* — Deeprose Subedi
(74) *Attorney, Agent, or Firm* — Jordan IP Law, LLC

(57) ABSTRACT

Systems, apparatuses and methods may leverage technology that recognizes a set of one or more hands in one more frames of a video signal during a first gesture control interaction between the set of one or more hands and an electronic device. Moreover, one or more additional body parts may be detected in the frame(s), wherein the additional body part(s) are excluded from the gesture control interaction. In one example, detecting the additional body part(s) includes determining that the additional body part(s) correspond to a different individual than a target individual associated with the set of hand(s).

24 Claims, 5 Drawing Sheets

(58) Field of Classification Search
CPC .............. A63F 13/537; A63F 13/06; G06T 2207/10021; G06T 2207/10016; G06T 2207/30196; G06T 2207/10024; G06T 2207/20112; G06T 7/11; G06T 7/246; G06T 7/20; G06T 7/593; G06T 7/174; G06T 7/251; G06T 7/254; G06T 7/70; G06T 2200/04; G06T 15/00; H04N 13/0239; H04N 2013/0081
See application file for complete search history.

(56) References Cited

U.S. PATENT DOCUMENTS

| | | | | |
|---|---|---|---|---|
| 8,830,312 | B2* | 9/2014 | Hummel | G06K 9/6202 |
| | | | | 348/77 |
| 9,721,383 | B1* | 8/2017 | Horowitz | G06T 17/20 |
| 9,785,247 | B1* | 10/2017 | Horowitz | G06F 3/017 |
| 2009/0079813 | A1* | 3/2009 | Hildreth | H04N 7/147 |
| | | | | 348/14.03 |
| 2009/0183125 | A1* | 7/2009 | Magal | G06F 3/017 |
| | | | | 715/863 |
| 2009/0244309 | A1* | 10/2009 | Maison | G06K 9/00369 |
| | | | | 348/222.1 |
| 2011/0293180 | A1 | 12/2011 | Criminisi et al. | |
| 2012/0076361 | A1 | 3/2012 | Fujiyoshi | |
| 2012/0163661 | A1 | 6/2012 | Lee et al. | |
| 2013/0201104 | A1 | 8/2013 | Ptucha et al. | |
| 2014/0003674 | A1* | 1/2014 | Coley | G06K 9/00382 |
| | | | | 382/115 |
| 2014/0307955 | A1 | 10/2014 | Liu et al. | |
| 2014/0347479 | A1* | 11/2014 | Givon | G06K 9/00342 |
| | | | | 348/143 |
| 2015/0104075 | A1* | 4/2015 | MacDougall | G06K 9/00355 |
| | | | | 382/106 |
| 2015/0177842 | A1* | 6/2015 | Rudenko | G06F 3/017 |
| | | | | 345/156 |
| 2017/0270356 | A1* | 9/2017 | Sills | G06F 3/017 |

OTHER PUBLICATIONS

Wikipedia, "3D Scanner", Wikipedia: the free encyclopedia, last modified Aug. 29, 2016, 14 pages.

Dewi Yanti Liliana et al., "The combination of palm print and hand geometry for biometrics palm recognition", International Journal of Video & Image Processing and Network Security, vol. 12 No. 01, Feb. 2012, 5 pages, International Journals of Engineering & Sciences.

Intel, "Intel RealSense SDK: Hand Tracking Tutorial", Intel Developer Zone, 17 pages, Intel Corporation.

International Search Report and Written Opinion for International Patent Application No. PCT/US2017/049323, dated Dec. 4, 2017, 11 pages.

International Preliminary Report on Patentability for International Patent Application No. PCT/US2017/049323, dated Apr. 11, 2019, 8 pages.

* cited by examiner

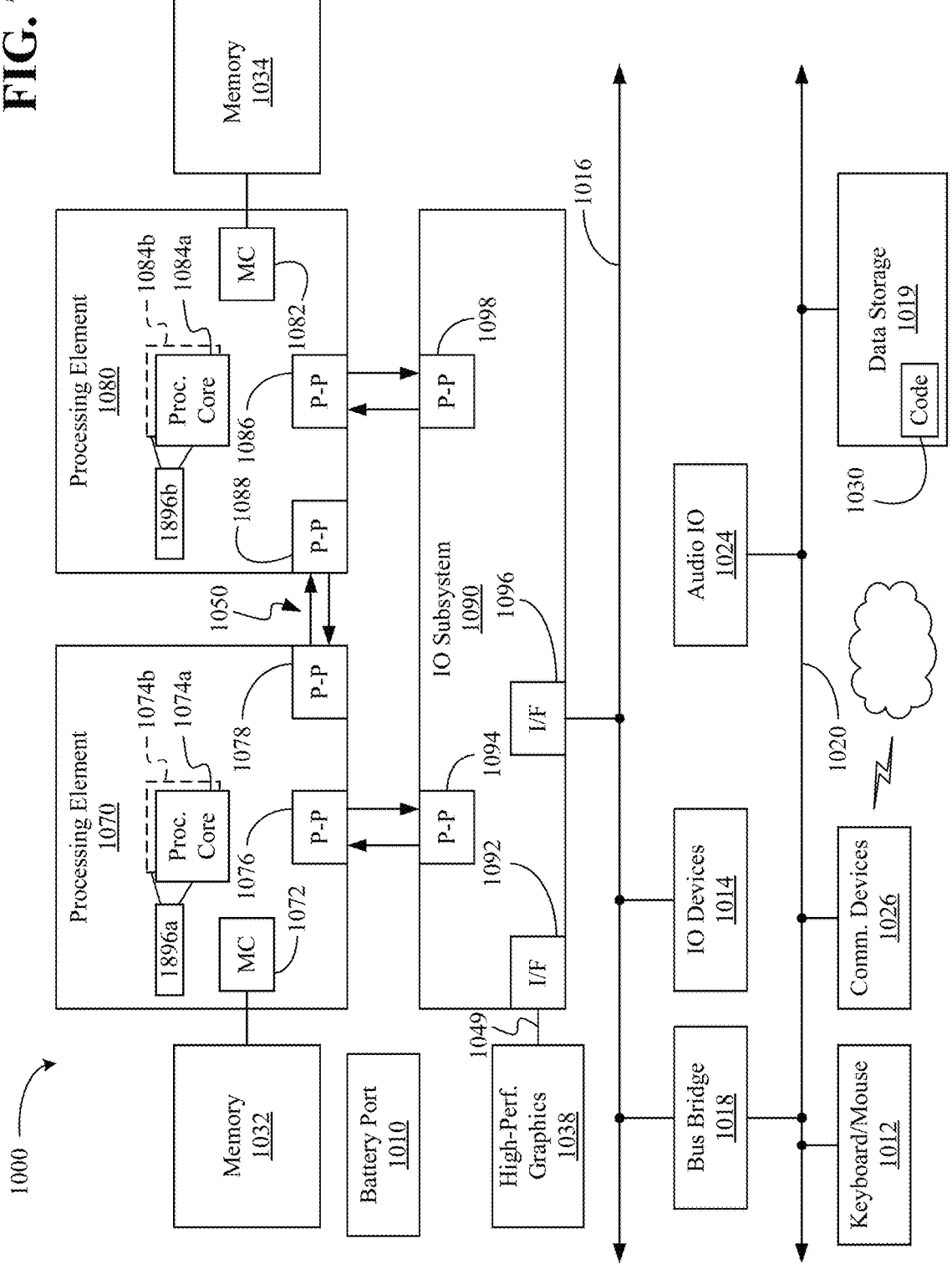

GESTURE EXPERIENCES IN MULTI-USER ENVIRONMENTS

TECHNICAL FIELD

Embodiments generally relate to automated gesture recognition. More particularly, embodiments relate to technology that improves gesture experiences in multi-user environments.

BACKGROUND

Automated gesture recognition may involve identifying the motions or postures of human body parts and using the identified motions/postures to control computers and other electronic devices. In multi-user environments, however, gesture recognition may be less effective due to the body parts of nearby individuals being identified as the hands of the user controlling the electronic device.

BRIEF DESCRIPTION OF THE DRAWINGS

The various advantages of the embodiments will become apparent to one skilled in the art by reading the following specification and appended claims, and by referencing the following drawings, in which:

FIG. 7 is a block diagram of an example of a computing system according to an embodiment.

DESCRIPTION OF EMBODIMENTS

Figure 1:
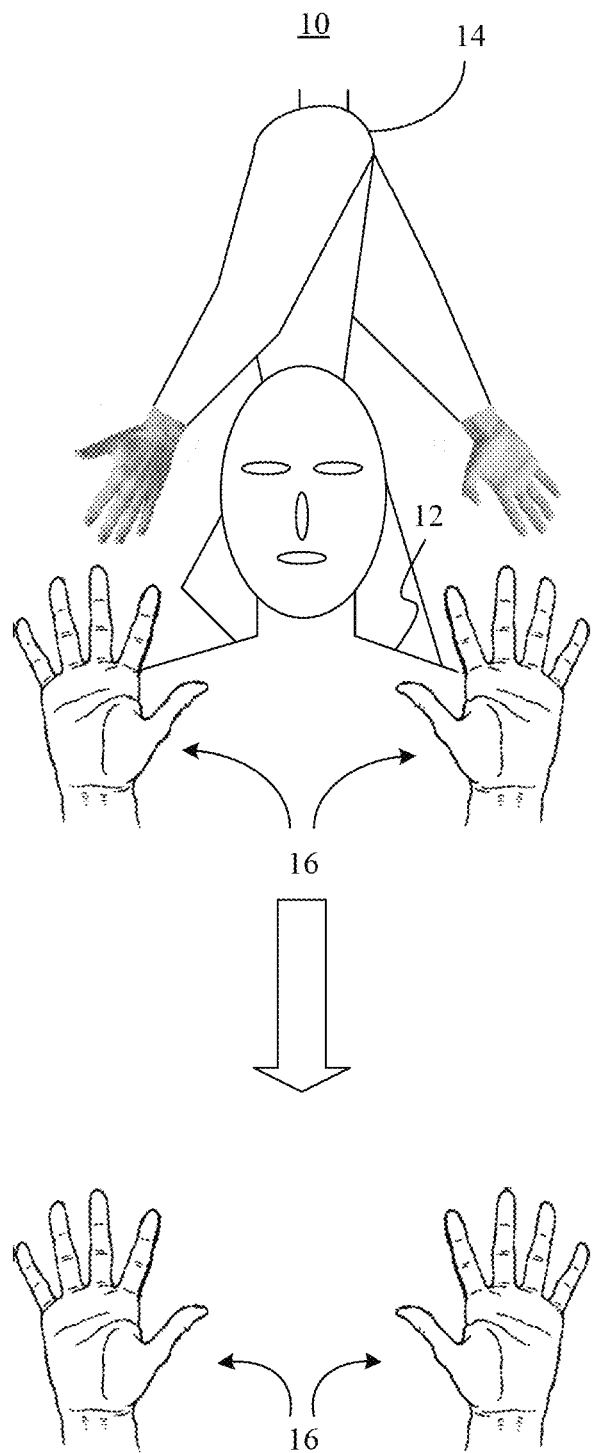
FIG. 1 is an illustration of an example of a multi-user environment according to an embodiment.

Turning now to FIG. 1, a multi-user environment 10 in which a first individual 12 (e.g., user, person) is in view of a computer (e.g., desktop computer, notebook computer, tablet computer, convertible tablet, smart phone, personal digital assistant/PDA, camera, camcorder, wearable computer, or other electronic device, not shown) while a second individual 14 walks behind the first individual 12. As will be discussed in greater detail, the computer may support gesture control interactions by enabling the hands 16 of the first individual 12 to control the computer through various gestures (e.g., poses, movements). Thus, the computer may capture a video signal of the multi-user environment 10, analyze the video signal to identify the gestures being made by the first user 12, and control/trigger one or more operations (e.g., cursor movements, key presses) on the computer based on the identified gestures. The second individual 14, however, may be also captured in the video signal, wherein body parts of the second individual 14 might be interpreted/identified as the hands 16 of the first individual 12. Accordingly, the computer may be configured to isolate the hands 16 of the first individual 12 by excluding other body parts such as, for example, the hands of the second individual 14, from the gesture control interaction.

Figure 2:
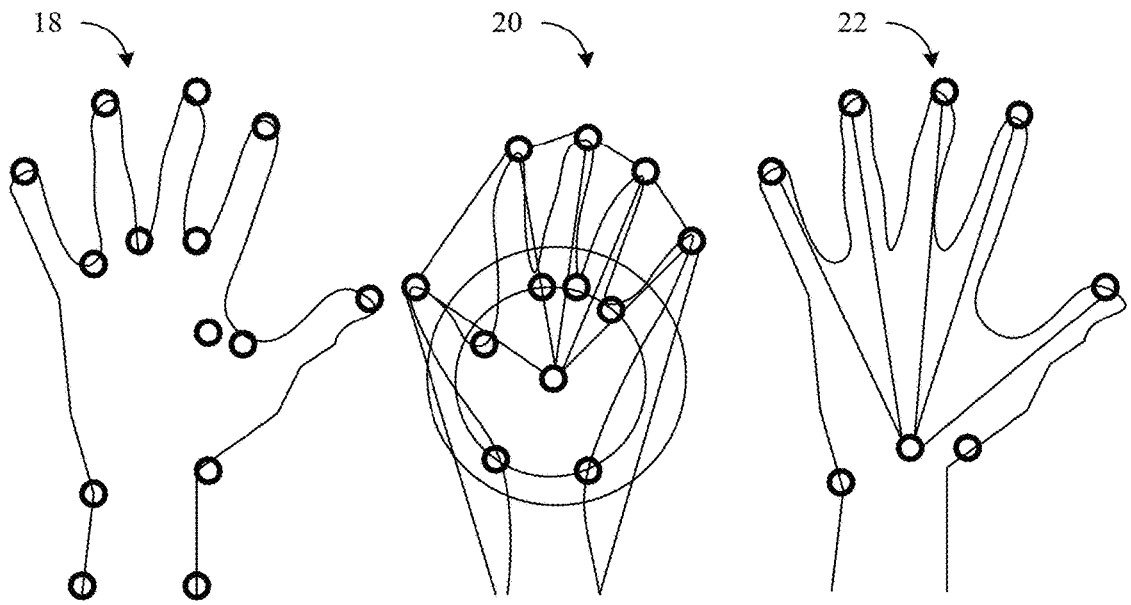
FIG. 2 is an illustration of examples of hand recognition measurements according to embodiments.

FIG. 2 shows examples of hand measurements that may enable a hand to be distinguished from additional body parts such as, for example, the hands of other individuals in view of a multi-user recognition apparatus. More particularly, a first example measurement 18 may uniquely identify the hand based on the positioning of specific hand features such as, for example, fingertips, finger webbing, wrist, etc. In another example measurement 20 distances such as, for example, the distance between the fingertips, the distance between the fingertips and the middle of the palm, the distance between the fingertips and the finger webbing, the distance between the fingertips and the wrist, the diameter of the palm, the diameter of the finger webbing, etc., may be used to recognize a specific hand. In yet another example measurement 22, the distance between the base of the palm and the fingertips may be used to distinguish between hands. The measurements 18, 20, 22 may provide enough precision to positively identify hands without recognition of any other body parts. Indeed, the illustrated measurements 18, 20, 22 may be particularly useful when the face is occluded by the hands (e.g., hands hide the face from the camera). Other approaches and/or measurements may also be used.

Figure 3:
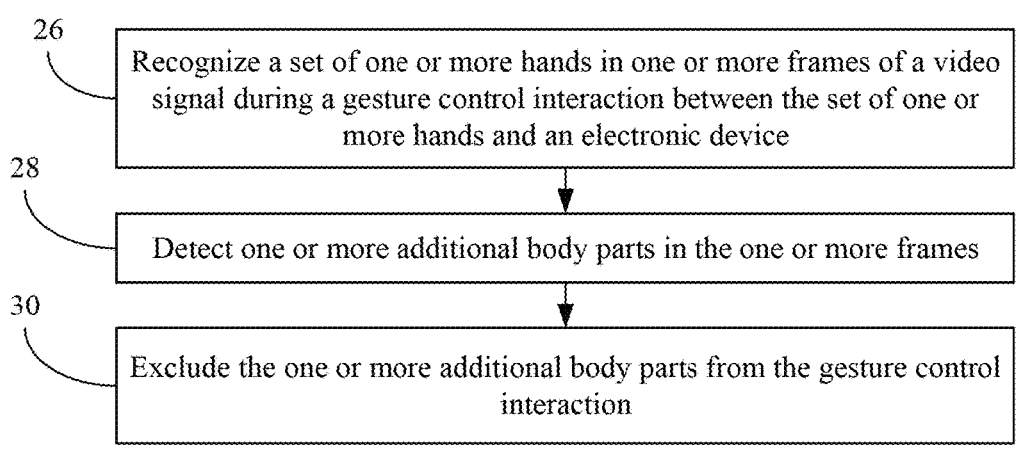
FIG. 3 is a flowchart of an example of a method of operating a multi-user recognition apparatus according to an embodiment.

FIG. 3 shows a method 24 of operating a multi-user recognition apparatus. The method 24 may be implemented in one or more modules as a set of logic instructions stored in a machine- or computer-readable storage medium such as random access memory (RAM), read only memory (ROM), programmable ROM (PROM), firmware (FW), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in method 24 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 26 provides for recognizing a first set of one or more hands in one or more frames of a video signal during a first gesture control interaction between the first set of one or more hands and an electronic device. Block 26 may therefore take into consideration various measurements such as, for example, the measurements 18, 20, 22 (FIG. 2), already discussed. The result of block 26 may therefore be the positive identification of one or more previously registered hands (e.g., the right hand, left hand or right and left hands of a particular "target" individual). Block 26 may also take into consideration other body parts such as, for example, the face, head, shoulders and/or torso of the target individual in question.

One or more additional body parts may be detected in the one or more frames at block 28. Block 28 might involve, for example, determining that one or more additional body parts correspond to a different individual than the target individual. Thus, the additional body parts may be a second set of one or more hands. The additional body parts may detected via depth sensing (e.g., if 3D cameras are used). For example, it might be determined that the additional body parts are positioned at a different viewing depth (e.g., either closer to or farther away than the first set of one or more hands). If 3D cameras are not used, block 28 may supplement the hand recognition with face and/or body recognition. Illustrated block 30 excludes the one or more additional body parts from the gesture control interaction. Thus, the gesture control interaction may include identifying one or more gestures based only on the first set of one or more hands and triggering one or more operations in an electronic device based on the one or more gestures.

Figure 4:
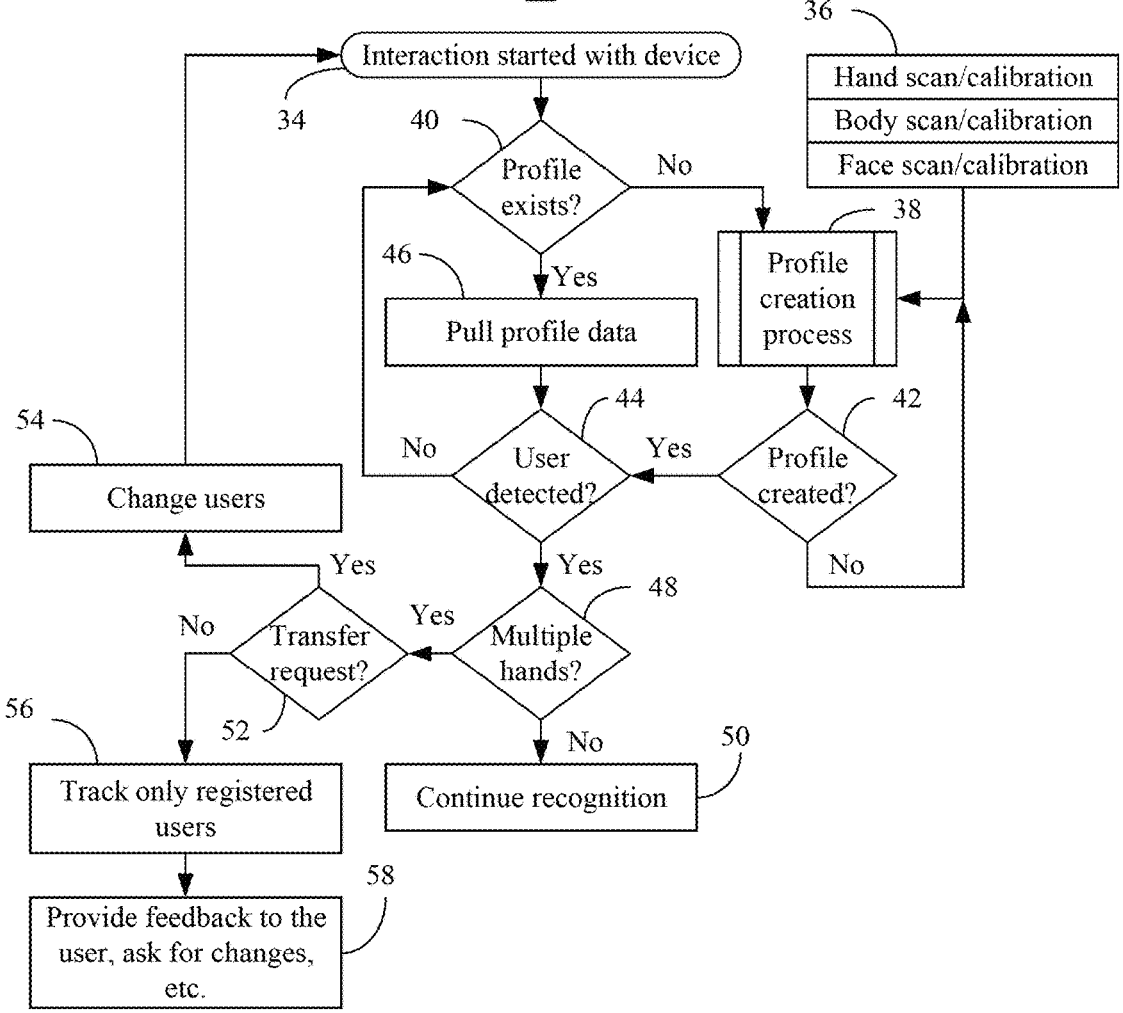
FIG. 4 is a flowchart of an example of a method of operating a profile-based multi-user recognition apparatus according to an embodiment.

FIG. 4 shows a more detailed method 32 of operating a profile-based multi-user recognition apparatus. The method 32 may be implemented in one or more modules as a set of logic instructions stored in a machine- or computer-readable storage medium such as RAM, ROM, PROM, FW, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated blocks 36 provide for conducting scan calibrations with regard to hand recognition, body recognition and/or face recognition, wherein the results are fed to a profile creation process at block 38. Blocks 36 and 38 may therefore be conducted online or offline with regard to the remainder of the method 32. Block 34 detects that gesture-based interaction with a device has started. A determination may be made at block 40 as to whether a profile exists. If a profile does not exist, the method 32 may proceed to the profile creation process 38, which has been calibrated by virtue of block 36. Block 38 may generally involve registering an individual (e.g., upon successfully authenticating the individual), capturing one or more frames of the hands, face and/or body of the registered individual, and analyzing the captured frames in accordance with various measurements such as, for example, the measurements 18, 20, 22 (FIG. 2), already discussed. The results of the analysis may be recorded in a user profile. A determination may be made at block 42 as to whether a profile was successfully created. If not, the profile creation process at block 38 may be repeated. If it is determined that one or more profiles exist, block 46 pulls/retrieves the profile data.

Once one or more profiles have been created, illustrated block 44 determines whether there is a match between the current user and at least one of the profiles. If there is no match (e.g., known user/individual) detected at block 44, the method 32 may return to block 40. If a match is detected at block 44, a determination may be made at block 48 as to whether multiple sets of one or more hands (e.g., multiple individuals) are detected in the field of view. If only one set of one or more hands are detected, illustrated block 50 continues with the gesture control interaction (e.g., identifying gestures and triggering operations based on the gestures).

If more than one set of one or more hands are detected at block 48, a determination may be made at block 52 as to whether a request to transfer control of the electronic device to a different individual than the target individual has been detected. If a transfer request has been detected, illustrated block 54 changes users so that a second set of one or more hands will be recognized and the first set of one or more hands will be excluded from the gesture control interaction. If a transfer request is not detected at block 52, only registered users may be tracked at block 56, wherein feedback may be provided to the user at block 58. Thus, the method 32 enables the transfer of control between multiple users.

Figure 5:
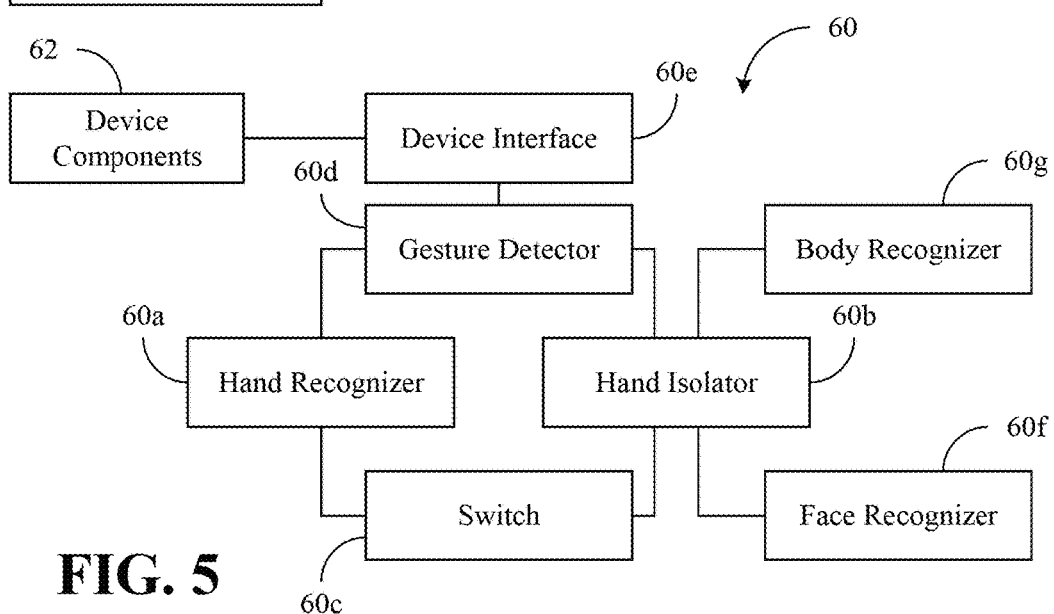
FIG. 5 is a block diagram of an example of a multi-user recognition apparatus according to an embodiment.

FIG. 5 shows a multi-user recognition apparatus 60 (60*a*-60*g*) that may be incorporated into a desktop computer, notebook computer, tablet computer, convertible tablet, smart phone, PDA, camera, camcorder, wearable computer, or other electronic device containing components 62 that may be controlled via gesture recognition. The apparatus 60, which may include logic instructions, configurable logic, fixed-functionality logic hardware, etc., or any combination thereof, may implement one or more aspects of the method 24 (FIG. 3). In the illustrated example, a hand recognizer 60*a* is configured to recognize a first set of one or more hands in one or more frames of a video signal during a first gesture control interaction between the first set of hand(s) and an electronic device. The hand recognizer 60*a* may obtain the video signal from one of the device components 62 or another source (e.g., remote connection). A hand isolator 60*b* may be communicatively coupled to the hand recognizer 60*a*, wherein the hand isolator 60*b* detects one or more additional body parts in the frame(s) and excludes the additional body part(s) from the first gesture control interaction.

In one example, the hand isolator 60*b* determines that the additional body part(s) correspond to a different individual than a target individual associated with the first set of hand(s). Moreover, the additional body part(s) may include a second set of one or more hands. The hand isolator 60*b* may also determine that the additional body part(s) are positioned at a different viewing depth than the first set of hand(s).

The apparatus 60 may also include a switch 60*c* configured to detect a request to transfer control of the electronic device to a different individual than a target individual associated with the first set of hand(s). The request may be issued via a special gesture, voice command, etc., or any combination thereof. In such a case, the switch 60*c* may cause the hand recognizer to recognize a second set of hand(s) in one or more frames of the video signal in response to the request, wherein the hand isolator 60*b* excludes the first set of hand(s) from a second gesture control interaction between the second set of hand(s) and the electronic device.

The illustrated apparatus 60 also includes a gesture detector 60*d* to identify gestures based on recognized hands (e.g., the first or second sets of one or more hands) and a device interface 60*e* (e.g., communications bus/link) communicatively coupled to the gesture detector 60*d*. The device interface 60*e* may trigger one or more operations in the components 62 of the electronic device based on the gestures. The apparatus 60 may also include a face recognizer 60*f* to recognize the faces of target individuals during gesture control interactions and a body recognizer 60*g* to recognize the bodies of target individuals during gesture control interactions.

Figure 6:
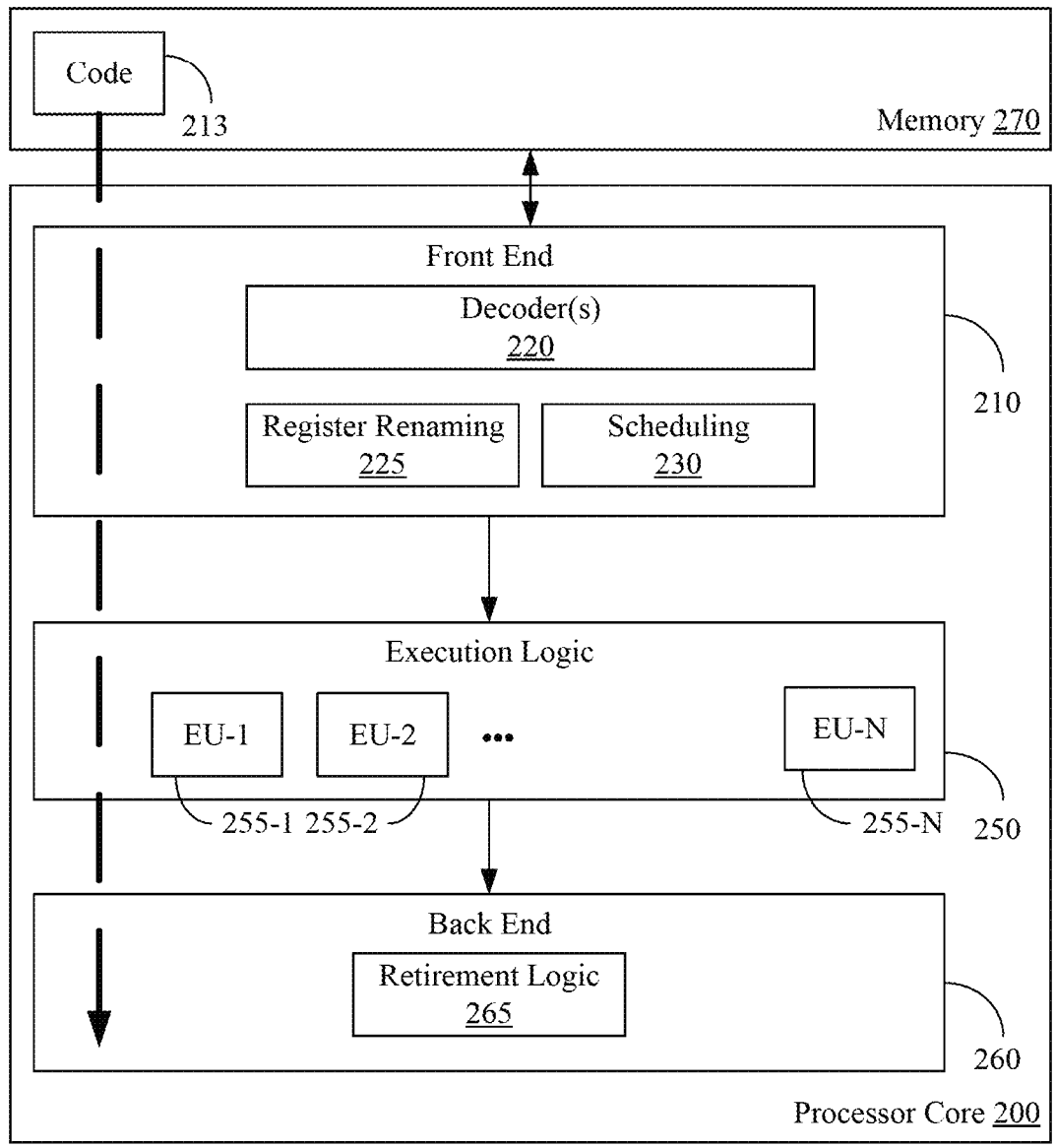
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 24 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 7, shown is a block diagram of a computing system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI)

bus, or a bus such as a PCI Express bus or another third generation I/O interconnect bus, although the scope of the embodiments are not so limited.

As shown in FIG. 7, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 24 (FIG. 3), already discussed, and may be similar to the code 213 (FIG. 6), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

ADDITIONAL NOTES AND EXAMPLES

Example 1 may include a multi-user recognition apparatus comprising a hand recognizer to recognize a first set of one or more hands in one or more frames of a video signal during a first gesture control interaction between the first set of one or more hands and an electronic device and a hand isolator communicatively coupled to the hand recognizer, the hand isolator to detect one or more additional body parts in the one or more frames and exclude the one or more additional body parts from the first gesture control interaction.

Example 2 may include the apparatus of Example 1, wherein the hand isolator is to determine that the one or more additional body parts correspond to a different individual than a target individual associated with the first set of one or more hands.

Example 3 may include the apparatus of Example 2, wherein the one or more additional body parts are to include a second set of one or more hands.

Example 4 may include the apparatus of Example 1, wherein the hand isolator is to determine that the one or more additional body parts are positioned at a different viewing depth than the first set of one or more hands.

Example 5 may include the apparatus of Example 1, further including a switch to detect a request to transfer control of the electronic device to a different individual than a target individual associated with the first set of one or more hands, wherein the hand recognizer is to recognize a second set of one or more hands in one or more frames of the video in response to the request, and wherein the hand isolator is to exclude the first set of one or more hands from a second gesture control interaction between the second set of one or more hands and the electronic device.

Example 6 may include the apparatus of any one of Examples 1 to 5, further including a gesture detector to identify one or more gestures based on the first set of one or more hands, and a device interface communicatively coupled to the gesture detector, the device interface to trigger one or more operations in the electronic device based on the one or more gestures.

Example 7 may include the apparatus of any one of Examples 1 to 5, further including a face recognizer to recognize a face of a target individual associated with the first set of one or more hands during the first gesture control interaction.

Example 8 may include the apparatus of any one of Examples 1 to 5, further including a body recognizer to recognize a body of a target individual associated with the first set of one or more hands during the first gesture control interaction.

Example 9 may include a method of operating a multi-user recognition apparatus comprising recognizing a first set of one or more hands in one or more frames of a video signal during a first gesture control interaction between the first set of one or more hands and an electronic device, detecting one or more additional body parts in the one or more frames, and excluding the one or more additional body parts from the first gesture control interaction.

Example 10 may include the method of Example 9, wherein detecting the one or more additional body parts includes determining that the one or more additional body parts correspond to a different individual than a target individual associated with the first set of one or more hands.

Example 11 may include the method of Example 10, wherein the one or more additional body parts include a second set of one or more hands.

Example 12 may include the method of Example 9, wherein detecting the one or more additional body parts includes determining that the one or more additional body parts are positioned at a different viewing depth than the first set of one or more hands.

Example 13 may include the method of Example 9, further including detecting a request to transfer control of the electronic device to a different individual than a target individual associated with the first set of one or more hands, recognizing a second set of one or more hands in one or more frames of the video signal in response to the request, and excluding the first set of one or more hands from a second gesture control interaction between the second set of one or more hands and the electronic device.

Example 14 may include the method of any one of Examples 9 to 13, further including identifying one or more gestures based on the first set of one or more hands, and triggering one or more operations in the electronic device based on the one or more gestures.

Example 15 may include the method of any one of Examples 9 to 13, further including recognizing a face of a target individual associated with the first set of one or more hands during the first gesture control interaction.

Example 16 may include the method of any one of Examples 9 to 13, further including recognizing a body of a target individual associated with the first set of one or more hands during the first gesture control interaction.

Example 17 may include at least one computer readable storage medium comprising a set of instructions, which when executed by an electronic device, cause the electronic device to recognize a first set of one or more hands in one or more frames of a video signal during a first gesture control interaction between the first set of one or more hands and the electronic device, detect the one or more additional body parts in the one or more frames, and exclude the one or more additional body parts from the first gesture control interaction.

Example 18 may include the at least one computer readable storage medium of Example 17, wherein the instructions, when executed, cause the computing device to determine that the one or more additional body parts correspond to a different individual than a target individual associated with the first set of one or more hands.

Example 19 may include the at least one computer readable storage medium of Example 18, wherein the one or more additional body parts are to include a second set of one or more hands.

Example 20 may include the at least one computer readable storage medium of Example 17, wherein the instructions, when executed, cause the computing device to determine that the one or more additional body parts are positioned at a different viewing depth than the first set of one or more hands.

Example 21 may include the at least one computer readable storage medium of Example 17, wherein the instructions, when executed, cause a computing device to detect a request to transfer control of the electronic device to a different individual than a target individual associated with the first set of one or more hands, recognize a second set of one or more hands in one or more frames of the video in response to the request, and exclude the first set of one or more hands from a second gesture control interaction between the second set of one or more hands and the electronic device.

Example 22 may include the at least one computer readable storage medium of any one of Examples 17 to 21, wherein the instructions, when executed, cause the computing device to identify one or more gestures based on the first set of one or more hands, and trigger one or more operations in the electronic device based on the one or more gestures.

Example 23 may include the at least one computer readable storage medium of any one of Examples 17 to 21, wherein the instructions, when executed, cause the computing device to recognize a face of a target individual associated with the first set of one or more hands during the first gesture control interaction.

Example 24 may include the at least one computer readable storage medium of any one of Examples 17 to 21, wherein the instructions, when executed, cause the electronic device to recognize a body of a target individual associated with the first set of one or more hands during the first gesture control interaction.

Example 25 may include a multi-user recognition apparatus comprising means for recognizing a first set of one or more hands in one or more frames of a video signal during a first gesture control interaction between the first set of one or more hands and an electronic device, means for detecting one or more additional body parts in the one or more frames, and means for excluding the one or more additional body parts from the first gesture control interaction.

Example 26 may include the apparatus of Example 25, wherein the means for detecting the one or more additional body parts includes means for determining that the one or more additional body parts correspond to a different individual than a target individual associated with the first set of one or more hands.

Example 27 may include the apparatus of Example 26, wherein the one or more additional body parts are to include a second set of one or more hands.

Example 28 may include the apparatus of Example 25, wherein the means for detecting the one or more additional body parts includes means for determining that the one or more additional body parts are positioned at a different viewing depth than the first set of one or more hands.

Example 29 may include the apparatus of Example 25, further including means for detecting a request to transfer control of the electronic device to a different individual than a target individual associated with the first set of one or more hands, means for recognizing a second set of one or more hands in one or more frames of the video signal in response to the request, and means for excluding the first set of one or more hands from a second gesture control interaction between the second set of one or more hands and the electronic device.

Example 30 may include the apparatus of any one of Examples 25 to 29, further including means for identifying one or more gestures based on the first set of one or more hands, and means for triggering one or more operations in the electronic device based on the one or more gestures.

Example 31 may include the apparatus of any one of Examples 25 to 29, further including means for recognizing a face of a target individual associated with the first set of one or more hands during the first gesture control interaction.

Example 32 may include the apparatus of any one of Examples 25 to 29, further including means for recognizing a body of a target individual associated with the first set of one or more hands during the first gesture control interaction.

Thus, technology described herein may create a "private" area for users in order to improve the gesturing experience by "locking in" on one's hands using, for example, a depth camera. From an input perspective, the user may scan his or her hand and a profile is automatically created from the hand dimensions. The solution may possibly be combined with body and/or face recognition in order to tune the recognition process. From an output perspective, the camera may only respond to hands/faces/bodies that have been previously scanned and authorized (e.g., all other un-scanned hands may not be able to control inputs). Accordingly, the technology described herein deals with complex "false positive" situations in which a user is operating a machine via hand/face/body recognition in an environment with multiple people, possibly moving around. Indeed, the technology described herein may improve the operation of electronic devices being manipulated through gesture recognition by reducing the likelihood of false positives.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
   a hand recognizer, implemented at least partly in one or more of configurable logic or fixed-functionality logic hardware, to recognize a first set of one or more hands of a target individual in one or more gesture frames of a video signal during a first gesture control interaction between the first set of one or more hands and an electronic device;
   a hand isolator, implemented at least partly in one or more of configurable logic or fixed-functionality logic hardware, communicatively coupled to the hand recognizer, the hand isolator to:
   determine that no profile exists for the target individual,
   in response to no profile existing for the target individual, authenticate the target individual,
   upon the authentication of the target individual being successful, capture one or more profile frames of the first set of one or more hands, analyze the one or more profile frames to identify one or more first measurements of the first set of one or more hands and register a new profile for the target individual that is to include the one or more first measurements,
   detect one or more first additional body parts in the one or more gesture frames,
   detect one or more second measurements of the one or more first additional body parts,
   determine that the one or more second measurements do not correspond to the one or more first measurements to determine that the one or more first additional body parts correspond to a different individual than the target individual, and
   exclude the one or more first additional body parts from the first gesture control interaction based on the one or more second measurements not corresponding to the one or more first measurements; and
   a switch, implemented at least partly in one or more of configurable logic or fixed-functionality logic hardware, to detect whether a request from the target individual to transfer control of the electronic device from the target individual to the different individual is received, wherein the request is a voice command of the target individual,
   wherein the hand recognizer is to track the target individual when the request is not received and to track the different individual when the request is received.

2. The apparatus of claim 1, wherein the one or more first additional body parts are to include a second set of one or more hands.

3. The apparatus of claim 1, wherein the hand recognizer is to recognize a second set of one or more hands of the different individual in one or more frames of the video in response to the request, and wherein the hand isolator is to exclude the first set of one or more hands from a second gesture control interaction between the second set of one or more hands and the electronic device.

4. The apparatus of claim 1, further including:
   a gesture detector, implemented at least partly in one or more of configurable logic or fixed-functionality logic hardware, to identify one or more gestures based on the first set of one or more hands; and
   a device interface, implemented at least partly in one or more of configurable logic or fixed-functionality logic hardware, communicatively coupled to the gesture detector, the device interface to trigger one or more operations in the electronic device based on the one or more gestures.

5. The apparatus of claim 1, further including a face recognizer, implemented at least partly in one or more of configurable logic or fixed-functionality logic hardware, to recognize a face of the target individual associated with the first set of one or more hands during the first gesture control interaction.

6. The apparatus of claim 1, further including a body recognizer, implemented at least partly in one or more of configurable logic or fixed-functionality logic hardware, to recognize a body of the target individual associated with the first set of one or more hands during the first gesture control interaction.

7. A method comprising:
   recognizing a first set of one or more hands of a target individual in one or more gesture frames of a video signal during a first gesture control interaction between the first set of one or more hands and an electronic device;
   determining that no profile exists for the target individual;
   in response to no profile existing for the target individual, authenticating the target individual;
   upon the authentication of the target individual being successful, capturing one or more profile frames of the first set of one or more hands, analyzing the one or more profile frames to identify one or more first measurements of the first set of one or more hands and registering a new profile for the target individual that is to include the one or more first measurements;
   detecting one or more first additional body parts in the one or more gesture frames;
   detecting one or more second measurements of the one or more first additional body parts;

determining that the one or more second measurements do not correspond to the one or more first measurements to determine that the one or more first additional body parts correspond to a different individual than the target individual;

excluding the one or more first additional body parts from the first gesture control interaction based on the one or more second measurements not corresponding to the one or more first measurements;

detecting whether a request from the target individual to transfer control of the electronic device from the target individual to the different individual is received, wherein the request is a voice command of the target individual;

tracking the target individual when the request is not received; and tracking the different individual when the request is received.

8. The method of claim 7, wherein the one or more first additional body parts include a second set of one or more hands.

9. The method of claim 7, further including:

recognizing a second set of one or more hands of the different individual in one or more frames of the video signal in response to the request; and excluding the first set of one or more hands from a second gesture control interaction between the second set of one or more hands and the electronic device.

10. The method of claim 7, further including:

identifying one or more gestures based on the first set of one or more hands; and triggering one or more operations in the electronic device based on the one or more gestures.

11. The method of claim 7, further including recognizing a face of the target individual associated with the first set of one or more hands during the first gesture control interaction.

12. The method of claim 7, further including recognizing a body of the target individual associated with the first set of one or more hands during the first gesture control interaction.

13. At least one non-transitory computer readable storage medium comprising a set of instructions, which when executed by an electronic device, cause the electronic device to:

recognize a first set of one or more hands of a target individual in one or more gesture frames of a video signal during a first gesture control interaction between the first set of one or more hands and the electronic device;

determine that no profile exists for the target individual;

in response to no profile existing for the target individual, authenticate the target individual;

upon the authentication of the target individual being successful, capture one or more profile frames of the first set of one or more hands, analyze the one or more profile frames to identify one or more first measurements of the first set of one or more hands and register a new profile for the target individual that is to include the one or more first measurements;

detect one or more first additional body parts in the one or more gesture frames;

detect one or more second measurements of the one or more first additional body parts;

determine that the one or more second measurements do not correspond to the one or more first measurements to determine that the one or more first additional body parts correspond to a different individual than the target individual;

exclude the one or more first additional body parts from the first gesture control interaction based on the one or more second measurements not corresponding to the one or more first measurements;

detect whether a request from the target individual to transfer control of the electronic device from the target individual to the different individual is received, wherein the request is a voice command of the target individual;

track the target individual when the request is not received; and track the different individual when the request is received.

14. The at least one non-transitory computer readable storage medium of claim 13, wherein the one or more first additional body parts are to include a second set of one or more hands.

15. The at least one non-transitory computer readable storage medium of claim 13, wherein the instructions, when executed, cause the electronic device to:

recognize a second set of one or more hands of the different individual in one or more frames of the video in response to the request; and exclude the first set of one or more hands from a second gesture control interaction between the second set of one or more hands and the electronic device.

16. The at least one non-transitory computer readable storage medium of claim 13, wherein the instructions, when executed, cause the electronic device to:

identify one or more gestures based on the first set of one or more hands; and trigger one or more operations in the electronic device based on the one or more gestures.

17. The at least one non-transitory computer readable storage medium of claim 13, wherein the instructions, when executed, cause the electronic device to recognize a face of the target individual associated with the first set of one or more hands during the first gesture control interaction.

18. The at least one non-transitory computer readable storage medium of claim 13, wherein the instructions, when executed, cause the electronic device to recognize a body of the target individual associated with the first set of one or more hands during the first gesture control interaction.

19. The apparatus of claim 1, wherein the hand recognizer is to identify a portion of the target individual, wherein the one or more first measurements include a distance between the first set of one or more hands and the portion.

20. The apparatus of claim 1, wherein the one or more first measurements include one or more measurements associated with a finger webbing of the first set of one or more hands or a wrist of the first set of one or more hands.

21. The apparatus of claim 1, wherein the one or more first measurements include a distance between a fingertip of the first set of one or more hands and one or more of a palm of the first set of one or more hands or a finger web of the first set of one or more hands.

22. The apparatus of claim 1, wherein the one or more first measurements include a distance between a fingertip of the first set of one or more hands and a wrist of the first set of one or more hands.

23. The apparatus of claim 1, wherein the one or more first measurements include a diameter associated with the first set of one or more hands.

24. The apparatus of claim 1, wherein the new profile is to be registered during the first gesture control interaction.

* * * * *